United States Patent [19]

Murata et al.

[11] Patent Number: 4,637,108
[45] Date of Patent: Jan. 20, 1987

[54] PALLET CHANGER

[75] Inventors: Kazushi Murata, Nishio; Toshiharu Takashima, Chiryu; Kunimichi Nakashima, Anjoh, all of Japan

[73] Assignee: Toyoda Koki Kabushiki Kaisha, Kariay, Japan

[21] Appl. No.: 770,580

[22] Filed: Aug. 29, 1985

[30] Foreign Application Priority Data

Sep. 24, 1984 [JP] Japan .................. 59-199758

[51] Int. Cl.$^4$ ............ B23Q 41/02; B65G 47/00
[52] U.S. Cl. ...................... 29/33 P; 29/563; 198/345; 198/465.1
[58] Field of Search ............ 29/33 P, 563, 568; 198/345, 339.1, 465.1, 465.2

[56] References Cited

U.S. PATENT DOCUMENTS

| | | | |
|---|---|---|---|
| 3,343,645 | 9/1967 | Doerfling | 198/345 |
| 3,466,739 | 9/1969 | Harman | 29/568 |
| 4,185,376 | 1/1980 | Johstone | 29/568 |
| 4,257,513 | 3/1981 | Siarto | 198/345 |
| 4,480,738 | 11/1984 | Mattson | 29/33 P X |

OTHER PUBLICATIONS

Article entitled "Fast Ways To Change Work, 1", American Machinist, Mar. 15, 1965, p. 109.

Primary Examiner—Z. R. Bilinsky
Attorney, Agent, or Firm—Oblon, Fisher, Spivak, McClelland & Maier

[57] ABSTRACT

A pallet changer including an arcuate clamp rail adapted to engage and support a pallet slidably, the arcuate clamp rail being provided in a work table in a machining center, and a plurality of arcuate support rails adapted to engage and support pallets slidably, the arcuate support rails being provided on a pallet pool so that they can be indexed to a pallet changing position. The support rail indexed to the pallet changing position completes a circular track for pallet conveyance conjointly with the clamp rail. Further, a swivel arm is disposed for rotation between the work table and the pallet changing position, the swivel arm being provided at both ends thereof with engaging hooks each capable of engaging an engaging block of each pallet disengageably. By the rotation of the swivel arm, two pallets are exchanged simultaneously along the above circular track between the work table and the pallet changing position.

6 Claims, 2 Drawing Figures

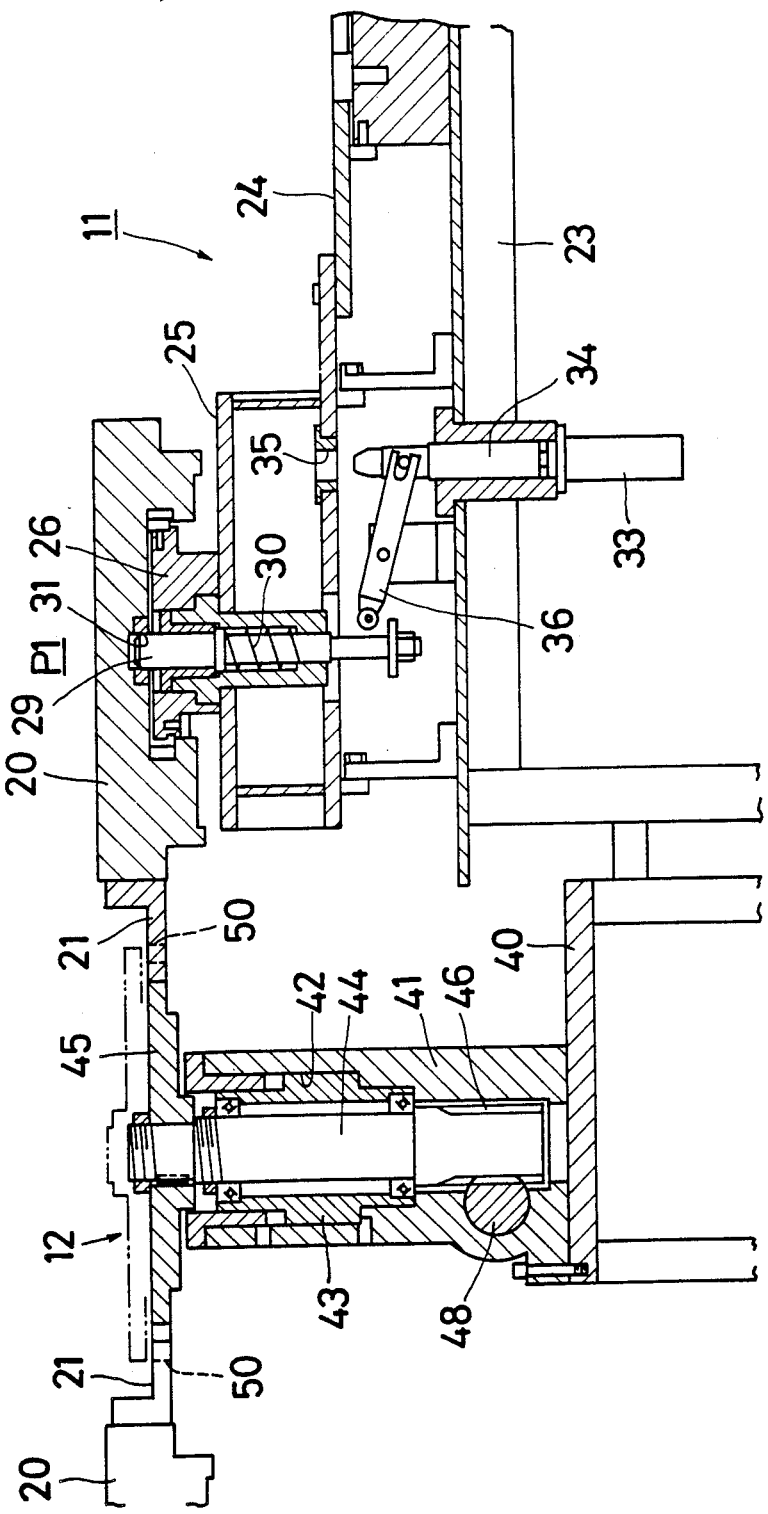

PALLET CHANGER

BACKGROUND OF THE INVENTION

1. Field of the Invention

The present invention relates to a pallet changer for changing pallets between a machine table in a machining center and a pallet changing position in a pallet pool.

2. Description of the Related Art

In a certain type of pallet changer for changing pallets between a machine table in a machining center and a pallet changing position in a pallet pool, a rotary table capable of supporting two pallets at a time is disposed between the machine table and the pallet changing position. A pallet to be carried onto the machine table is carried onto one end of the rotary table in advance from the pallet changing position and is allowed to stand by there. Upon completion of machining, the pallet on the machine table is carried onto the other end of the rotary table. Thereafter, the rotary table is turned 180° whereby the pallet to be machined is transferred onto the machine table from the rotary table. In another type of a pallet changer, a pallet pool is disposed in proximity to a machine table. Upon completion of machining, the pallet on the machine table is carried to a vacant pallet changing position in the pallet pool, thereafter the pallet to be carried onto the machine table is indexed to the pallet changing position and then transferred onto the machine table.

In the former type, the provision of the rotary table requires a fairly increased floor space and the shortening of the pallet changing time encounters a limit because of a large number of operations required for pallet changing (carrying out→turning→carrying in).

In the latter type, too, it is impossible to expect shortening of the pallet changing time, although the drawback on the floor space can be overcome. Particularly, the latter type requires a pallet pool indexing operation during pallet changing and therefore a great increase of the pallet changing time is unavoidable.

SUMMARY OF THE INVENTION

Accordingly, it is the object of the present invention to provide an improved pallet changer capable of being mounted at a small floor space and also capable of changing pallets in a short time.

To be brief, in the pallet changer of the present invention, an arcuate clamp rail for engaging and supporting a pallet slidably is provided in a work table in a machining center, and a plurality of arcuate support rails for engaging and supporting pallets slidably are provided on a pallet pool so that they can be indexed to a pallet changing position. The support rail indexed to the pallet changing position completes a circular track for pallet conveyance conjointly with the above clamp rail. Further, a swivel arm provided at both ends thereof with engaging hooks each capable of disengageably engaging an engaging block of each pallet is provided for rotation between the work table and the pallet changing position. By the rotation of the swivel arm, two pallets are exchanged simultaneously along the above circular track between the work table and the pallet changing position.

In such construction, the pallet pool can be disposed in proximity to the machine table in the machining center, thus permitting reduction of the floor space. Further, since pallets can be changed simultaneously between the machine table and the pallet pool, the pallet changing time can be shortened to a remarkable extent as compared with that in the conventional construction.

BRIEF DESCRIPTION OF THE DRAWINGS

FIG. 2 is a sectional view taken on line II—II of FIG. 1, showing a principal portion of the pallet changer.

DETAILED DESCRIPTION OF A PREFERRED EMBODIMENT

Figure 1:
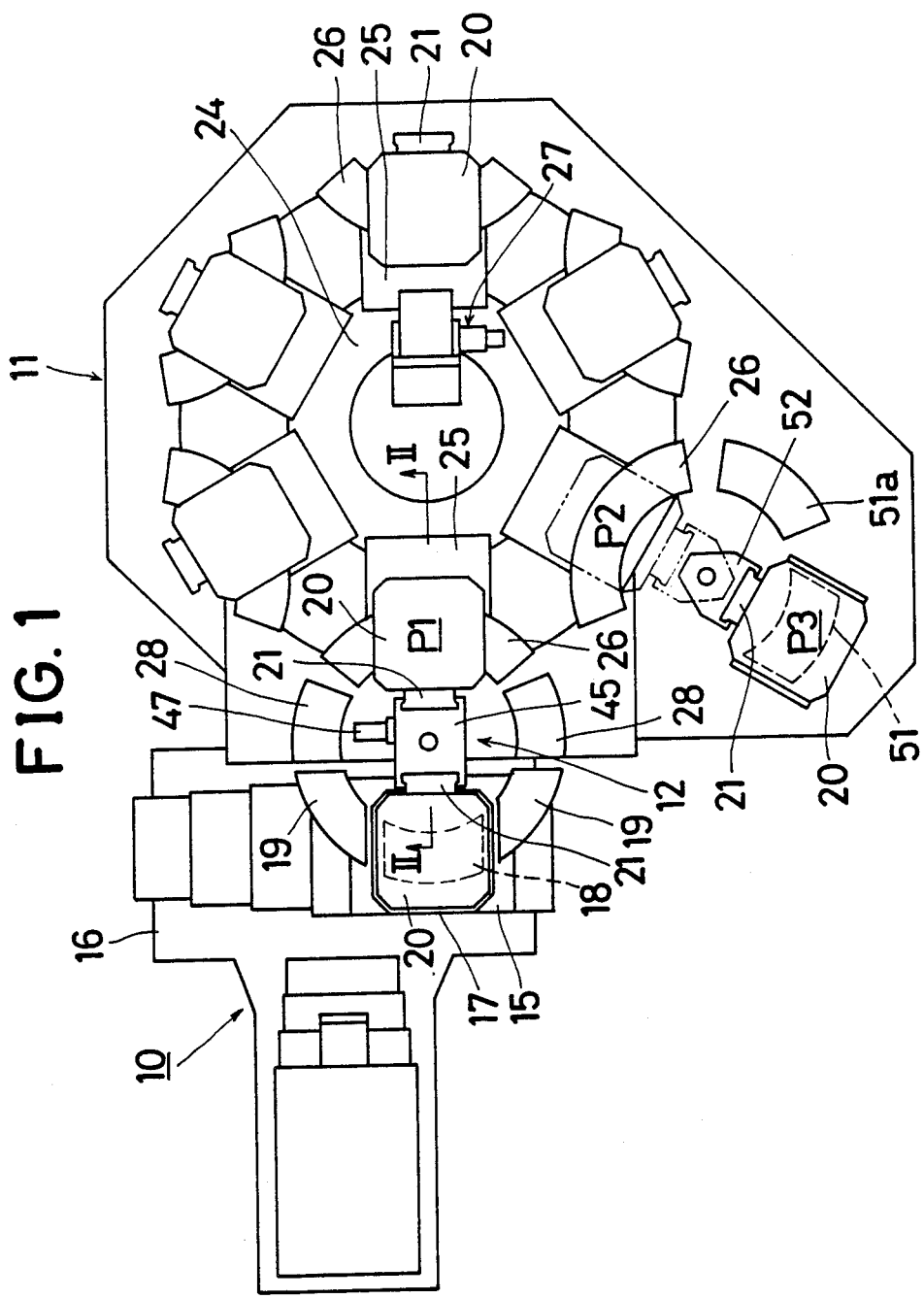
FIG. 1 is a plan view of a pallet changer according to an embodiment of the present invention.

In FIGS. 1 and 2, the reference numerals 10, 11 and 12 denote a machining center, a pallet pool and a pallet turning device, respectively. A machine table 15 in the machining center 10 is mounted on a bed 16 horizontally movably, and a work table 17 is mounted for rotational indexing on the machine table 15. An arcuate clamp rail 18 is mounted in the work table 17 and is vertically movable so that a pallet 20 adapted to be slidably engaged with and supported by the clamp rail 18 is positioned and clamped on the work table 17 upon descent of the clamp rail 18 and unclamped upon ascent of the same rail. Further, on the machine table 15 are arranged a pair of arcuate guide rails 19 on both sides of the clamp rail 18. At the time of changing pallets, the machine table 15 is positioned at a predetermined constant position opposed to a pallet changing position in the pallet pool 11 as will be described later.

The pallet pool 11 is provided with a base 23 which is mounted in front of the machine table 15, and a rotary plate 24 is supported at a central portion of the base 23 so that it can rotate in a horizontal plane. Also supported by the base 23 are a plurality of pallet supports 25 which are arranged around the rotary plate 24 so as to be movable together with the rotary plate. The pallet supports 25 are connected to the rotary plate 24 in equiangular positions on the circumference of the rotary plate 24. The pallet supports 25 are each provided thereon with an arcuate support rail 26 which can slidably engage and support a pallet 20. The support rails 26 are positioned at a height which corresponds to a raised position of the clamp rail 18. The pallet supports 25 are successively indexed to a pallet changing position P1 opposed to the machine table 15 with rotation of the rotary plate 24 which is performed by an indexing drive unit 27. A pair of guide rails 28 are mounted on the base 23, the guide rails 28 being arranged on both sides of the support rail 26 on the pallet support 25 which has been indexed to the pallet changing position P1. When the machine table 15 is positioned to the predetermined constant position for pallet changing, the support rails 26 and the guide rails 28 complete a pallet conveying circular track conjointly with the clamp rail 18 on the work table 17 and the guide rails 19.

The pallet supports 25 each support a first positioning rod 29 vertically movably so that the upper end of the rod is retractably protrudable from the upper surface of the support rail 26, as shown in FIG. 2. The positioning rod 29 is normally held in a position projecting from the support rail 26 by the biasing force of a spring 30 and engages a central hole 31 of the pallet 20 which is engaged with and supported by the support rail 26, to thereby restrict the movement of the pallet 20.

Further, a second positioning rod 34 adapted to be moved up and down by a cylinder device 33 is supported by the base 23. When moved upward, the positioning rod 34 comes into engagement with an engaging hole 35 of the pallet support 25 which has been indexed to the pallet changing position P1, to thereby position the pallet support 25. To the positioning rod 34 is connected one end of an actuating lever 36 which is pivotally connected to the base 23. The other end of the actuating lever 36 extends to a position where it engages the first positioning rod 29 of the pallet support 25 which has been indexed to the pallet changing position P1. Therefore, when moved up by the cylinder device 33 to position the pallet support 25 to the pallet changing position P1, the second positioning rod 34 is forced into the engaging hole 35. At the same time, the actuating lever 36 is pivoted in interlock with the upward movement of the positioning rod 34, whereby the first positioning rod 29 is brought down against the spring 30 and disengaged from the central hole 31.

The pallet turning device 12 has a base 40 provided between the pallet changing position P1 in the pallet pool 11 and the machine table 15. Mounted on the base 40 is a support member 41, and a cylinder 42 is formed in the support member 41, with a piston 43 being fitted in the cylinder 42 vertically movably. A rotating shaft 44 is fitted in the piston 43 concentrically through bearings, and a first swivel arm 45 is fixed to the upper end of the rotating shaft 44. At the lower portion of the rotating shaft 44 is formed a pinion 46 which is in mesh with a slidable rack 48 connected to a rotative drive cylinder 47 (see FIG. 1), the cylinder 47 being attached to the support member 41.

As the piston 43 moves vertically, the swivel arm 45 is engaged with or disengaged from the engaging block 21 of the pallet 20. More specifically, when the piston 43 is in its raised position, the swivel arm 45 is not engaged at both hooks 50 thereof with the engaging blocks 21 of pallets 20. In this state, the machine table 15 is positioned to the predetermined constant position for pallet changing, and a pallet support 25 is indexed to the pallet changing position P1 in the pallet pool 11. Thereafter, as the piston 43 is moved down, both end hooks 50 of the swivel arm 45 are brought into engagement with the engaging blocks 21 of both pallets 20 carried on the work table 17 and the pallet support 25, respectively. In this state, the swivel arm 45 is turned 180° by operation of the rotative drive cylinder 47, whereby both pallets 20 carried respectively on the clamp rail 18 and the support rail 26 are guided along the foregoing circular track and exchanged.

On the base 23 is disposed a loading position P3 in opposed relation to a pallet carrying-out position P2 which is adjacent to the pallet changing position P1. In the loading position P3 is mounted an arcuate fixed rail 51 which completes a semi-circular track conjointly with the support rail 26 on the pallet support 25 and an intermediate support rail 51a. At the central portion of this arcuate track is supported a second swivel arm 52 rotatably and vertically movably, the second swivel arm 52 having an engaging hook at only one end thereof. Like the first swivel arm 45, the swivel arm 52 in its lowered position is engaged with the engaging block 21 of the pallet 20 on the pallet support 25 and then turned to transfer the pallet 20 to the loading position P3 for attaching and detaching workpieces. The mechanism for vertically moving and rotating the swivel arm 52 is the same as that of the first swivel arm 45. Also in the pallet carrying-out position P2 there is provided a mechanism for positioning the pallet support 25 and releasing the pallet 20 from restraint. This mechanism is similar in construction and function to the mechanism comprising the second positioning rod 34, cylinder device 33 and actuating lever 36.

The following description is now provided about operations in the construction described above.

The pallet 20 to be next transferred to the machining center 10 is indexed to the pallet changing position P1 and the pallet support 25 is positioned to the pallet changing position P1 by operation of the cylinder device 33 and at the same time the restraint of the pallet 20 against the support rail 26 is released. In this state, upon completion of workpiece machining in the machining center 10, the machine table 15 is positioned to the predetermined constant position for pallet changing and thereafter the clamp rail 18 is raised, whereby the pallet 20 thereon is unclamped. At this time, the clamp rail 18 in its raised position completes a circular track of a predetermined height conjointly with the support rail 26 which has been indexed to the pallet changing position P1.

Then, the first swivel arm 45 is moved down and its both end hooks 50 are brought into engagement with the engaging blocks 21 of both pallets 20. In this state the swivel arm 45 is turned 180°, whereby the pallet 20 on the work table 17 is transferred to the pallet changing position P1 while being guided by the clamp rail 18 and support rail 26, and at the same time the pallet 20 in the pallet changing position P1 is carried onto the work table 17 while being guided by the support rail 26 and clamp rail 18. Then, the clamp rail 18 is moved down whereby the pallet 20 is positioned and clamped on the work table 17. At the same time, the swivel arm 45 is moved up whereby its engaging hooks 50 are disengaged from the engaging blocks 21 of both pallets 20. Thereafter, the machine table is moved to a predetermined position for machining the workpiece on the pallet thus carried on the work table 17.

The pallet 20 thus returned to the pallet pool 11 and now carrying the machined workpiece thereon is indexed to the pallet carrying-out position P2 and then transferred from the position P2 to the loading position P3 by means of the second arm 52. In the loading position P3, the machined workpiece is detached from the pallet 20 and a new unmachined workpiece is attached to the pallet by the operator or robot. Thereafter, the pallet 20 is again returned to the pallet carrying-out position P2 by rotation of the swivel arm 52.

Obviously, numerous modifications and variations of the present invention are possible in light of the above teachings. It is therefore to be understood that within the scope of the appended claims, the present invention may be practiced otherwise than as specifically described herein.

What is claimed is:

1. A pallet changer for a machine tool, including:
   a base;
   a rotary plate provided on said base for rotation about a vertical axis;
   a plurality of pallet supports mounted for rotating integrally with said rotary plate, said pallet supports being disposed around said vertical axis;
   an indexing means for selectively indexing said plural pallet supports to a pallet changing position opposite a table of the machine tool;
   pallets for mounting a workpiece to be machined, one of said pallets being carried on each of said pallet supports;

a first arcuate pallet guide for guiding the pallets along an arcuate track attached to each of said pallet supports;
a second arcuate pallet guide provided on said table of the machine tool for guiding the pallets along an arcuate track;
a plurality of third arcuate pallet guides which are provided for connecting as a single circular track the first pallet guide on one of said pallet supports indexed to said pallet changing position and the second pallet guide on said table, wherein said plural third pallet guides include a pair of fixed pallet guides positioned adjacent both ends of said first pallet guide on said one pallet support which has been indexed to said pallet changing position; and
a pallet turning device for turning the pallet on said one pallet support in said pallet changing position and the pallet on said table simultaneously in one direction along the circular track completed by said first, second and third pallet guides, said pallet turning device being provided between said pallet changing position and said table of the machine tool.

2. A pallet changer as set forth in claim 1, wherein said plural third pallel guides further include a pair of pallet guides fixed on said table for connecting the second pallet guide on the table to said pair of fixed pallets associated with both ends of the first pallet guide on said pallet support.

3. A pallet changer as set forth in claim 2, wherein said second pallet guide is movable vertically and in a raised position thereof it has the same height as that of the first pallet guide on the pallet support indexed to said pallet changing position and that of said two pairs of fixed pallet guides.

4. A pallet changer as set forth in claim 3, wherein said pallet turning device provided between said table and said pallet changing position comprises:
a swivel arm rotatable about a vertical axis and movable vertically along said vertical axis;
means for rotatively driving said swivel arm; and
means for moving said swivel arm vertically between a lowered position in which both ends of the swivel arm engage the pallet on said table and the pallet in said pallet changing position and a raised position in which such engagement is released.

5. A pallet changer as set forth in claim 1, further including:
a first positioning means provided in each of said pallet supports for engaging the pallet on each said pallet and thereby positioning the pallet relative to the pallet support;
a second positioning means provided on said base in said pallet changing position for engaging the pallet support indexed to the pallet changing position and thereby positioning the pallet support to said changing position; and
a positioning drive means having a single actuator and functioning to disengage said first positioning means from said pallet during engagement of said second positioning means with the pallet support indexed to said pallet changing position.

6. A pallet changer as set forth in claim 1, wherein a pallet carrying-in/out position is provided away from said pallet changing position by a predetermined angle and a workpiece mounting position is provided opposedly to said pallet carrying-in/out position, and which further includes:
a pallet carrying-in/out guide means fixed on said base in said workpiece mounting position and extending from near one end portion of the first pallet guide on the pallet support which has been indexed to said pallet carrying-in/out position, concentrically with the arc of this first pallet guide.

* * * * *